O. HEINS & C. M. & J. E. WILD.
GEARING.
APPLICATION FILED JULY 27, 1916.
1,266,259.
Patented May 14, 1918.
3 SHEETS—SHEET 1.
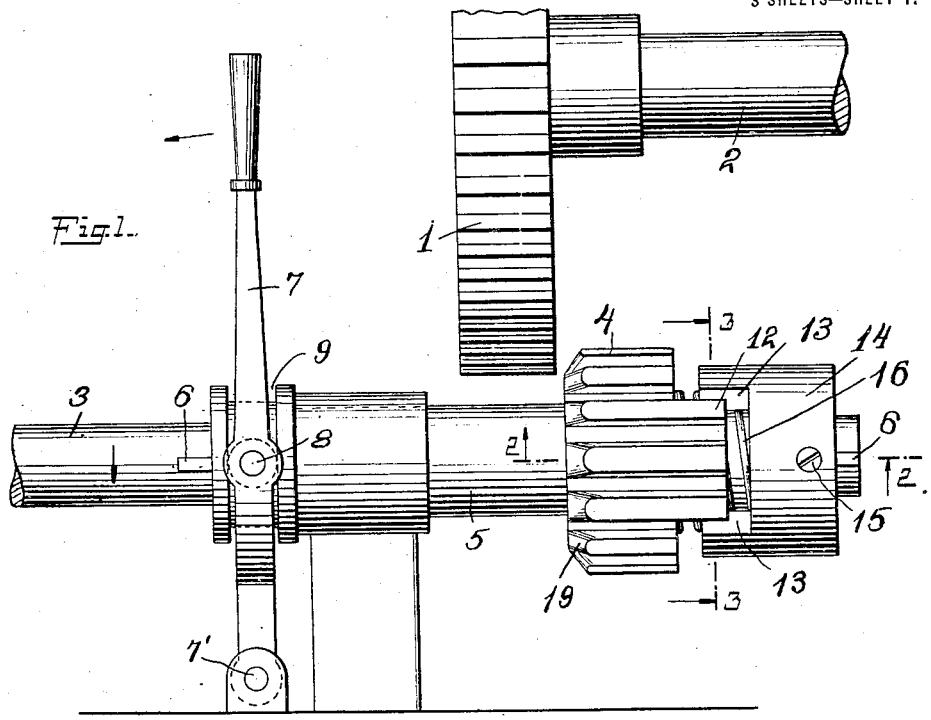
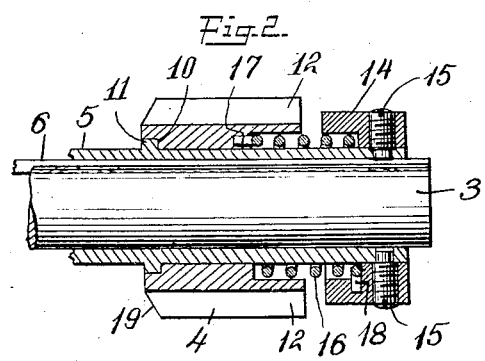
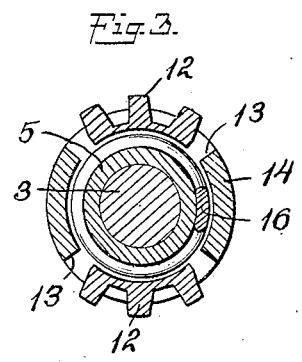
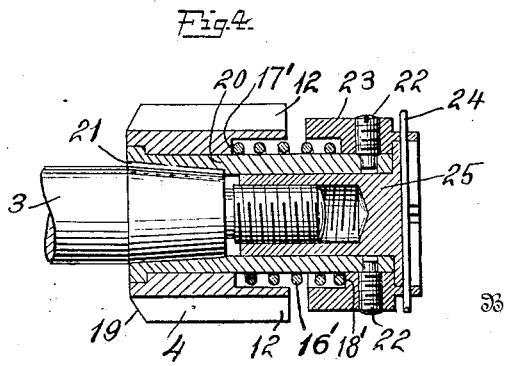
Inventors
Otto Heins, Charles M. Wild
and Julius E. Wild
By their Attorneys O. HEINS & C. M. & J. E. WILD.
GEARING.
APPLICATION FILED JULY 27, 1916.
1,266,259.
Patented May 14, 1918.
3 SHEETS—SHEET 2.
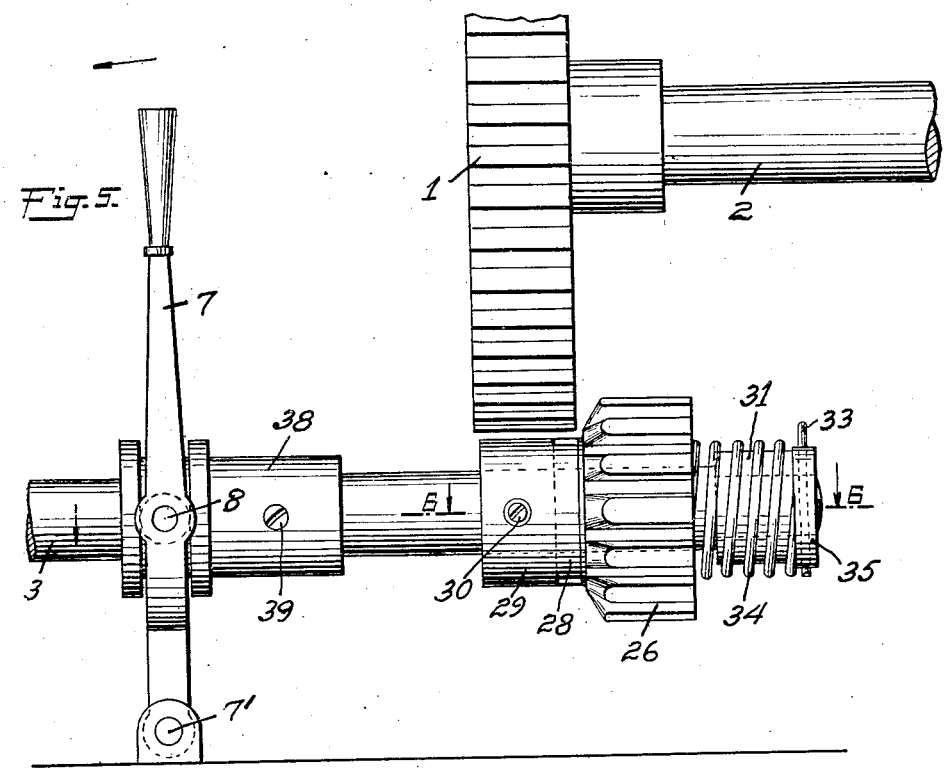
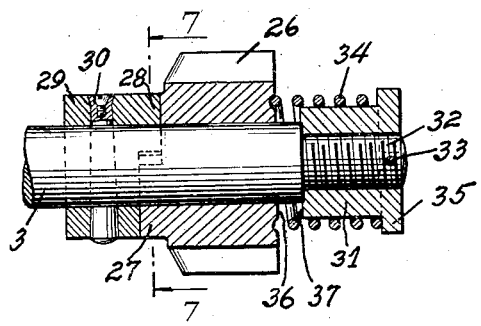
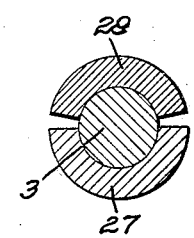
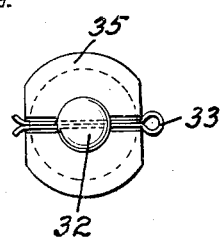
INVENTORS
Otto Heins, Charles M. Wild
and Julius E. Wild
BY
ATTORNEYS

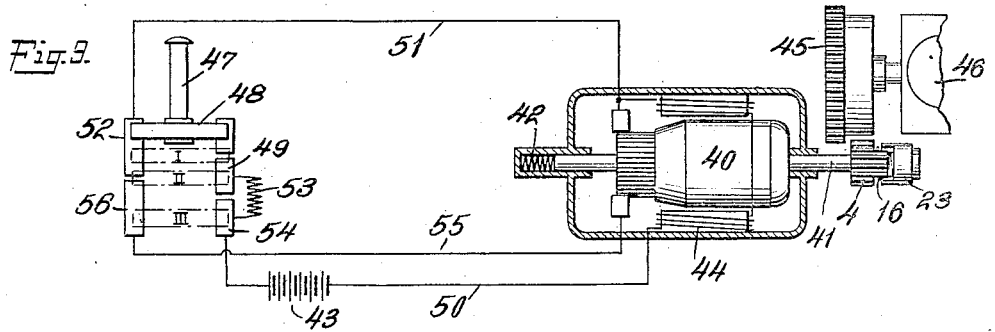
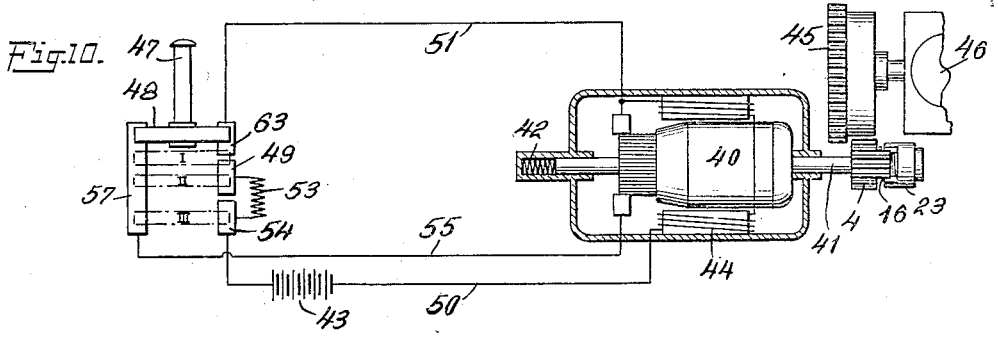
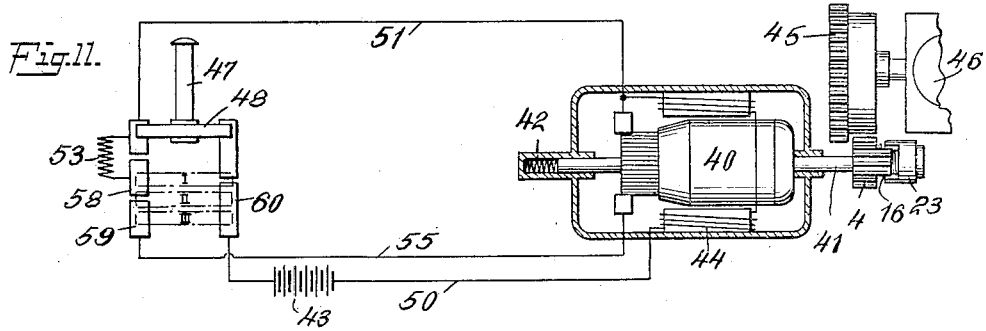
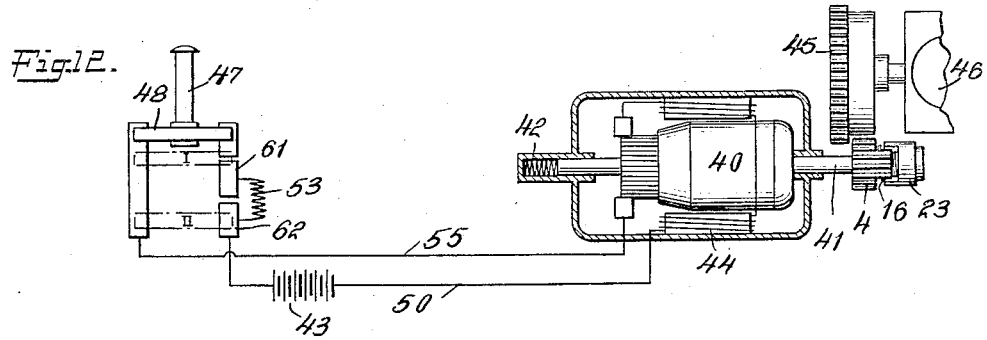

UNITED STATES PATENT OFFICE.

OTTO HEINS, OF NEW YORK, N. Y., AND CHARLES M. WILD AND JULIUS E. WILD, OF SPRINGFIELD, MASSACHUSETTS, ASSIGNORS TO BOSCH MAGNETO COMPANY, OF NEW YORK, N. Y., A CORPORATION OF NEW YORK.

GEARING.

1,266,259.

Specification of Letters Patent.

Patented May 14, 1918.

Application filed July 27, 1916. Serial No. 111,659.

*To all whom it may concern:*

Be it known that we, OTTO HEINS, residing at No. 336 West 88th street, city, county, and State of New York, CHARLES M. WILD, residing at No. 14 Springfield street, Springfield, county of Hampden, State of Massachusetts, and JULIUS E. WILD, residing at 14 Springfield street, Springfield, county of Hampden, State of Massachusetts, have invented certain new and useful Improvements in Gearing; and we do hereby declare the following to be a full, clear, and exact description of the invention, such as will enable others skilled in the art to which it appertains to make and use the same.

In disengageable gearing comprising driving and driven shafts and gears mounted thereon, it is customary to mount one of the gears fast, and to spline the other gear so that it is rotatable with the shaft but movable axially thereon into and out of engagement with the first gear; or else to mount the second gear fast and move its shaft axially. These arrangements operate satisfactorily in the movement of engagement when the teeth of the gears happen to be in meshing postion, but where the gearing is not readily accessible, or for other reasons cannot be brought by hand into meshing position, considerable difficulty may arise. Shaping the engaging sides of the teeth ameliorates the conditions somewhat, although clashing still occurs frequently, especially if one of the gears has comparatively few teeth; and wear and damage may be excessive if the driving gear is in rapid rotation and the driven gear is under load during the meshing period.

Attempts have been made to overcome the difficulties by slowly rotating the driving gear until, by reason of the axially directed force applied thereto, the gears are partly or completely engaged, whereupon the gearing is driven at full speed. Other attempts have been made by mounting the driving gear on a worm to convert the rotary movement of the driving shaft into an axial or a combined axial and rotary movement of the gear during the meshing period. Still other attempts have been made by mounting the driving gear on a worm which is moved axially as well as slowly rotated during the meshing period.

In accordance with our invention, one of the gears, herein termed the "pinion," is mounted on a shaft or sleeve or other carrying member for rotative movement thereon through a limited angle, preferably equal to the angle subtended by at least the thickness of one tooth, to thereby render the pinion capable of turning alone from clashing position to meshing position. The pinion is also capable of a limited amount of movement along its axis of rotation, independently of its carrying member and independently of its rotative movement thereon, and a spring is arranged in back of the pinion so that when the carrying member is moved axially in a direction of engagement, and the gears clash, the spring is compressed or otherwise stressed in such manner as to force the pinion into engagement with the gear as soon as the teeth of the pinion slide off the teeth of the gear into meshing position. In these arrangements, the spring when stressed is sufficiently powerful to force the pinion partly or completely into engagement with the gear almost immediately that the meshing position is attained, and as a result of the facts that the pinion alone is moved by the spring, and the rotative and axial movements of the pinion on the carrying member are independent of each other at all positions, this meshing movement may be made extremely rapid especially if the pinion has but little inertia to axial movement.

To insure absolutely that the pinion moves from clashing position to meshing position, it is sometimes preferable that the pinion be rotated at the same time that it is moved axially. However, on account of the speed at which the spring forces the pinion into engagement with the gear as soon as the meshing position is attained, it is not necessary, although it may be preferable in some cases, to reduce the speed of a continuously rotating driving motor, or to provide a phase of slow rotation of the pinion distinct from the phase of normal acceleration in starting the driving motor. In fact, the movement of engagement produced by the spring may be made so rapid that the teeth of the gears have sufficient contact area before the gearing starts to drive the load in any of these arrangements, that excessive wear and broken teeth are practically eliminated.

The operation may be enhanced by effecting a continuing axial movement of the carrying member concurrently with the engaging movement of the pinion, because by so doing, the rapidity and the extent of the engaging movement are increased and thus the area of contact between the teeth at the time that the gearing starts to drive the load is greater than it would otherwise be.

Thus our invention comprehends the use of a pinion mounted on its carrying member for a limited amount of rotative movement thereon and also for a limited amount of axial movement thereon independently of its rotative movement, a spring being arranged behind the pinion so that, in case the teeth should initially clash, the spring is stressed as a result of the additional axial movement of the carrying member alone, and then snaps the pinion into partial or complete engagement with the gear almost immediately that the teeth start to slide off each other. The means for moving the carrying member axially may be a manually operated lever, or the movement may result directly from an axial movement of the rotor of a driving motor. In either case, the axial movement of the carrying member may be continued during the period in which the pinion is being snapped into engagement.

Our invention is applicable generally to disengageable gearing, as for instance in many kinds of machines, and for speed change gears in moving vehicles, and it is particularly applicable to starting apparatus for engines, such as internal combustion engines.

In the accompanying drawings illustrating desirable forms of the invention in several applications, Figure 1 shows one form of the invention for general use in which, for example, the pinion is mounted on a sleeve splined on the driving shaft; Fig. 2 is a section on line 2—2 of Fig. 1; Fig. 3 is a section on line 3—3 of Fig. 1; Fig. 4 shows a central section like Fig. 2 of another form of the invention, mounted on a sleeve fast on the driving shaft; Fig. 5 shows another form of the invention for general use in which, for example, the pinion is mounted directly on the driving shaft; Fig. 6 is a section on line 6—6 of Fig. 5; Fig. 7 is a section on line 7—7 of Fig. 6; Fig. 8 is an elevation of the right hand end of the driving shaft of Fig. 5; Figs. 9 to 12 show diagrammatically the arrangement of Fig. 4 mounted on the armature shaft of an electric motor for starting internal combustion engines, for example, wherein the motor and the circuits therefor have different arrangements to provide for different modes of operation.

Referring particularly to Figs. 1 to 3, the gear 1 is mounted fast on the shaft 2, which is suitably journaled for rotation. The shaft 3 is suitably journaled for rotation in the direction indicated by the arrow in Fig. 1, and in such position that the pinion 4 may be engaged with the gear 1. The sleeve 5 is splined on the shaft 3 by a feather and groove connection 6 so as to be slidable therealong but rotatable therewith at all positions. The lever 7 pivoted at 7' carries a pin 8 projecting loosely into a groove 9 of the sleeve to slide the sleeve and parts carried thereby along the shaft 3 from the disengaged position shown in Fig. 1 to a position in which the pinion 4 and gear 1 are in complete engagement with each other.

The pinion 4 is loosely journaled on the sleeve 5 so as to be capable of rotative movement thereon and axial movement thereon independently of the rotative movement in all positions. The shoulder 10 coöperates with a shoulder 11 on the sleeve to limit the outward axial movement of the pinion, and the diametrically opposite projecting sections of teeth at 12 form a coupling part extending into the jaws 13 of the part 14, which is fastened at 15 to the sleeve, thus forming between the pinion and its carrying member a coupling having an appropriate amount of rotative play. The compression spring 16 is coiled about the sleeve and has its ends extending into the holes 17 and 18 of the pinion 4 and coupling part 14. The two coupling parts are properly proportioned to permit the required amount of rotative play of the pinion on the sleeve, equal in this case to the angle subtended by about one and one-half teeth of the pinion, and also to permit a suitable amount of axial movement of the pinion on the sleeve equal in this case to about one-fourth the driving face of the pinion teeth excluding the beveled and sharpened part at 19. The spring permits independent rotative and axial movements of the pinion on the sleeve and is sufficiently powerful when compressed to aid materially in forcing the teeth of the pinion from clashing position with the teeth of the gear and then snapping the pinion into engagement over a part of its driving face instantly that the pinion advances on the sleeve to meshing position.

If desired, the ends of the spring 16 may be disconnected from the pinion 4 and coupling part 14, and merely abut against them, as will be understood from the description appearing hereinafter in connection with Fig. 4. Assuming that the parts are in the disengaged position shown in Fig. 1, then upon swinging the lever 7 to the left, the sleeve 5 is moved toward the left. If the teeth happen to be in meshing position, the pinion 4 slides into engagement with the gear 1. If the shaft 3 is rotating during the meshing period, or is thereafter started into rotation, the pinion starts to drive the gear as soon as the jaws 13 of the coupling part 14 contact with the extensions 12 of the pinion. However, if the teeth clash upon axial movement of the sleeve on the shaft, the pinion is pressed back on the sleeve by the gear, thereby compressing the spring 16 until the pinion and the coupling part 14 abut and prevent further axial movement of the sleeve. The compressed spring may by itself be powerful enough to slide the beveled and sharpened teeth of the pinion off the teeth of the gear to meshing position, and then snap the pinion into partial engagement with the gear; of if such is not the case, a small amount of rotation of the shaft 3 by hand or during an initial phase of combined rotary and axial movement thereof by a starting motor or during the normal period of acceleration from rest, may be resorted to in order to turn the pinion from clashing position to meshing position. In fact, the spring forces the pinion so rapidly into engagement as soon as the meshing position is attained, that the shaft may be rotated at comparatively high speed during the meshing operation, and still the area of contact between the teeth of the pinion and gearing is sufficient at the time the jaws 13 of the part 14 come into contact with the extension 12 of the pinion, that the teeth are not unduly worn and not damaged, especially if the axial movement of the sleeve is continued by pulling the lever 7 farther to the left as the pinion is being snapped by the spring 16 into engagement with the gear.

The arrangement of Fig. 4 is similar to that of the preceding figures, except that the ends of the spring 16′ are not connected to the pinion 4 or coupling part 23, but merely abut the shoulders 17′ and 18′ thereof; and that the sleeve 20, on which the pinion 4 is loosely journaled, is fastened to the shaft for axial movement therewith as well as for rotation therewith. In this construction, the sleeve 20 is keyed at 21 to the shaft 3 and is fastened at 22 to the coupling part 23 which, as in the preceding figures, has jaws in loose driving engagement with the axial extensions of the pinion 4. The coupling part 23 is fastened by the cotter pin 24 to the internally threaded plug 25 which is screwed onto the threaded end of the shaft 3.

The operation of the arrangement of Fig. 4 is substantially like the foregoing, except that the shaft 3 is moved axially to engage the pinion 4 with the gear. However, it should be remarked that when the ends of the spring 16 or 16′ are connected to the pinion and coupling part, the pinion, when disengaged, is maintained by the spring in its fully advanced position on the sleeve 5 or 20. In that case the arrangement is not as well adapted for rotation in both directions as in the case in which the ends of the spring merely abut the pinion and coupling part.

In Figs. 5 to 8, the pinion 26 is mounted loosely on the driving shaft 3 and has a mutilated hub forming a jaw 27 coöperative with a jaw 28 of the coupling part 29 which is pinned at 30 to the shaft 3. The two jaws 27 and 28 permit an appropriate amount of rotative play of the pinion 26 on the shaft 3, as may be observed in Fig. 7, and also limit the outward axial movement of the pinion on the shaft. The nut 31 is screwed on the threaded end 32 of the shaft 3 and is fastened thereto by the cotter pin 33. The coiled spring 34 abuts the pinion 26 and the flange 35 of the nut and permits the pinion 26 to move axially on the shaft 3, independently of its rotative movement thereon, until its face 36 contacts with the adjacent face 37 of the nut 31. The sleeve 38 is pinned at 39 to the shaft 3, and the lever 7 is capable of moving the shaft sufficiently to the left in Fig. 5 to engage the pinion 26 and the gear 1. The operation of this arrangement will be understood from the foregoing.

The several embodiments shown herein may be applied to the shaft of an electric or other form of starting motor. In Figs. 9 to 12, we show the embodiment of Fig. 4 applied to an electric starting motor of a well known kind in which the armature is held in a magnetically decentered position when the circuit to the motor is interrupted. The armature 40 of the motor is mounted on the shaft 41 and the spring 42 normally holds the armature in the magnetically decentered position illustrated when no current flows from the battery 43 to the field winding 44. the pinion then being disengaged from the fly wheel gear 45 of the internal combustion engine 46.

In Fig. 9, the switch 47 is illustrated in inoperative position, but when the switch bridge 48 is depressed to position I into contact with the stud 49, current flows from the battery through the conductor 50, field winding 44, conductor 51, stud 52, switch bridge 48, stud 49, starting resistance 53 and stud 54 to the other terminal of the battery. Upon depressing the switch bridge to position II, the current flowing through the field winding divides, a large part passing through the conductor 51 and stud 52 to the switch bridge 48, and a comparatively small part being shunted through the armature winding, conductor 55 and stud 56 to the switch bridge, where the two currents recombine and flow through the stud 49, starting resistance 53 and stud 54 to the other terminal of the battery. As soon as the switch bridge leaves the stud 52, all of the current passes through the armature and field windings in series, and as soon as the switch bridge reaches the stud 54 the starting resistance 53 is cut out and full current is supplied to the motor.

Thus, in the first operative position I, the armature is sucked toward its magnetically centered position, and if the teeth of the pinion 4 happen to be in meshing position with the teeth of the gear 45, the pinion is fully engaged without difficulty. However, if the teeth clash, the spring 16 is compressed and the armature is prevented from reaching its magnetically centered position. If the compressive stress of the spring 16, together with the pull of the armature 40, is sufficiently powerful to cause the teeth of the pinion to slide off the teeth of the gear, the pinion turns on its sleeve until meshing position is attained, whereupon the spring 16 snaps the pinion into engagement with the gear and the armature simultaneously continues its axial movement to the magnetically centered position. In the second operative position II of the switch, wherein a comparatively small current flows through the armature winding, the armature starts into slow rotation. If the pinion is not engaged with the gear in the first position of the switch, slow rotation of the sleeve almost instantly causes the teeth to slide off each other and permits the spring 16 to snap the pinion into engagement with the gear. In the final position III of the switch, full current is supplied to the armature and field windings in series and the motor starts to bring the engine up to speed.

The connections shown in Fig. 10 are similar to those shown in Fig. 9 excepting the first operative position I of the switch provides a shunt through the armature winding by reason of the long stud 57, thereby producing a slow rotary movement of the shaft 41 concurrently with the initial axial movement thereof. In the second position II, the armature winding is connected in series with the field winding, and in the final position III, the starting resistance is cut out.

In accordance with connections shown in Fig. 11, the armature winding is not shunted in the first operative position I of the switch, and thus the armature is moved axially without slow rotation, just as in the arrangement of Fig. 9. In the second position II, wherein the switch bridge 48 bridges the studs 58 and 59 and connects them to stud 60, the armature winding is shunted around the starting resistance 53 which is then in series with the field winding. By making the starting resistance of suitably high value, substantially all of the current flowing through the field winding will, in this position of the switch, be caused to pass through the armature. In the final position III of the switch, the starting resistance 53 is cut out and full current flows to the armature and field windings in series. Thus, in this arrangement, the motor starts into rotation at substantially normal acceleration just after the armature is drawn toward its magnetically centered position.

In the arrangement shown in Fig. 12, the armature and field windings are permanently connected in series, so that the armature is given an axial movement toward its magnetically centered position, and is simultaneously started into rotation at its normal acceleration, the starting resistance 53 being included in the first operative position I between the studs 61 and 62 to provide easier starting and being cut out in the second position II. If desired, the starting resistance may be omitted and the switch have a single operative position.

In all of the arrangements shown in Figs. 9 to 12, the movement of the switch should be timed by the operator to accord with the desired operation of the motor. However, the starting period is usually of such short duration that the movement is a continuous one and substantially uniform. As soon as the engine starts to operate under its power, the spring 42, which was stressed by the movement of the armature 40 to its magnetically centered position, forces the armature back and thereby disengages the pinion 4 from the gear 45. The switch 47 is released and returns to its inoperative position. The switch is constructed in the well known way so that in the return movement the switch bridge 48 does not bridge the studs 52 and 56 of Fig. 9, or the studs 49 and 63 of Fig. 10, or the studs 58 and 59 of Fig. 11.

We claim:

1. In disengageable gearing, a gear, a pinion-carrying member, a pinion mounted on the carrying member for rotative and axial movements independently thereof, a spring behind the pinion constructed and arranged to be stressed upon axial movement of the pinion on the carrying member, a coupling having a limited amount of rotative play and being arranged to drive the pinion in all of its axial positions on the carrying member, and means for engaging and disengaging the pinion and gear.

2. In disengageable gearing, a gear, a pinion-carrying member, a pinion journaled on a smooth portion of the carrying member for rotative and axial movements independently of the carrying member, a spring behind the pinion constructed and arranged to be stressed upon axial movement of the pinion on the carrying member, a coupling having a limited amount of rotative play and being arranged to drive the pinion in all of its axial positions on the carrying member, and means for engaging and disengaging the pinion and gear.

3. In disengageable gearing, a gear, a pinion-carrying member, a pinion mounted on the carrying member for rotative and axial movements independently thereof, a spring behind the pinion constructed and arranged to be stressed upon axial movement of the pinion on the carrying member, a coupling having a limited amount of rotative play and being arranged to drive the pinion in all of its axial positions on the carrying member, and means for moving the carrying member axially to engage and disengage the pinion and gear.

4. In disengageable gearing, a gear, a pinion-carrying member, a pinion journaled on a smooth portion of the carrying member for rotative and axial movements independently of the carrying member, a spring behind the pinion constructed and arranged to be stressed upon axial movement of the pinion on the carrying member, a coupling having a limited amount of rotative play and being arranged to drive the pinion in all of its axial positions on the carrying member, and means for moving the carrying member axially to engage and disengage the pinion and gear.

5. In disengageable gearing, a gear, a pinion-carrying member, a pinion mounted on the carrying member for rotative and axial movements independently thereof, a spring connected to the pinion and its carrying member and constructed and arranged to be stressed upon axial movement of the pinion upon its carrying member, a coupling having a limited amount of rotative play and being arranged to drive the pinion in all of its axial positions on the carrying member, and means for engaging and disengaging the pinion and gear.

6. In disengageable gearing, a gear, a pinion-carrying member, a pinion mounted on the carrying member for rotative and axial movements independently thereof, a spring behind the pinion constructed and arranged to be stressed upon axial movement of the pinion of the carrying member, a coupling having a limited amount of rotative play and being arranged between the pinion and the carrying member to drive the pinion in all of its axial positions thereon, and means for engaging and disengaging the pinion and gear.

7. In disengageable gearing, a gear, a pinion-carrying member, a pinion mounted on the carrying member for rotative and axial movements independently thereof, a coupling having a limited amount of rotative play and being arranged to drive the pinion in all of its axial positions on the carrying member and comprising a part fast with the carrying member and a coöperative part formed by axial extensions of the pinion, a spring behind the pinion constructed and arranged to be stressed upon axial movement of the pinion on the carrying member, and means for engaging and disengaging the pinion and gear.

8. In disengageable gearing, a gear, a pinion-carrying member, a pinion mounted on the carrying member for rotative and axial movements independently thereof, a spring behind the pinion constructed and arranged to be stressed upon axial movement of the pinion on its carrying member and also arranged to limit the axial movement of the pinion on its carrying member in one direction, a part fast with the carrying member for limiting the axial movement of the pinion on its carrying member in the opposite direction, a coupling having a limited amount of rotative play and being arranged to drive the pinion in all of its axial positions on the carrying member, and means for engaging and disengaging the pinion and gear.

9. In disengageable gearing, a gear, a pinion-carrying member, a pinion mounted on the carrying member for rotative and axial movements independently thereof, a spring behind the pinion constructed and arranged to be stressed upon axial movement of the pinion on its carrying member, a coupling having a limited amount of rotative play and being arranged to drive the pinion in all of its axial positions on the carrying member, and means for moving the carrying member in an axial direction to engage the pinion and gear, said means permitting the continuing axial movement of the carrying member concurrently with the engaging movement of the pinion and gear.

10. The combination with an internal combustion engine having a gear, a starting motor having a rotor normally out of its centered position, a pinion carried by the rotor for rotative and axial movements independently thereof, a spring behind the pinion constructed and arranged to be stressed upon axial movement of the pinion relatively to the rotor, and a coupling having a limited amount of rotative play and being arranged to drive the pinion in all of its axial positions relatively to the rotor, of a source of power supply for the motor, and power connections which first connect the source of power to the rotor to draw the rotor to its centered position and thereby connect the pinion and gear, and which then drive the pinion to bring the engine up to its starting speed.

11. The combination with an internal combustion engine having a gear, an electric starting motor having an armature normally out of its centered position, a pinion carried by the armature for rotative and axial movements independently thereof, a spring behind the pinion constructed and arranged to be stressed upon axial movement of the pinion relatively to the armature, and a coupling having a limited amount of rotative play and being arranged to drive the pinion in all of its axial positions relatively to the armature, of a source of power supply for the motor, and electric connections which connect the source of power to the armature to first draw the armature to its centered position and thereby connect the pinion and gear, and which then drive the pinion to bring the engine up to its starting speed.

In testimony whereof we affix our signatures.

OTTO HEINS.
CHARLES M. WILD.
JULIUS E. WILD.